(12) United States Patent
Sato

(10) Patent No.: US 7,960,930 B2
(45) Date of Patent: Jun. 14, 2011

(54) CONTROL APPARATUS AND METHOD FOR MOTOR DRIVE SYSTEM

(75) Inventor: Ryoji Sato, Toyohashi (JP)

(73) Assignee: Toyata Jidosha Kabushiki Kaisha, Toyota (JP)

( * ) Notice: Subject to any disclaimer, the term of this patent is extended or adjusted under 35 U.S.C. 154(b) by 468 days.

(21) Appl. No.: 12/085,313

(22) PCT Filed: Nov. 24, 2006

(86) PCT No.: PCT/IB2006/003334
§ 371 (c)(1),
(2), (4) Date: May 21, 2008

(87) PCT Pub. No.: WO2007/066182
PCT Pub. Date: Jun. 14, 2007

(65) Prior Publication Data
US 2009/0237013 A1      Sep. 24, 2009

(30) Foreign Application Priority Data
Dec. 8, 2005  (JP) .................................. 2005-355087

(51) Int. Cl.
H02P 7/00   (2006.01)
(52) U.S. Cl. ........................ 318/432; 318/599; 318/811
(58) Field of Classification Search .................. 318/430, 318/432, 433, 434, 437, 560, 599, 689, 700, 318/715, 721, 779, 799, 800, 801, 807, 811, 318/529
See application file for complete search history.

(56) References Cited

U.S. PATENT DOCUMENTS

| 4,023,083 A * | 5/1977 | Plunkett ........................ 318/802 |
| 4,047,083 A * | 9/1977 | Plunkett ........................ 318/807 |
| 5,166,593 A * | 11/1992 | De Doncker et al. ......... 318/800 |
| 5,804,939 A * | 9/1998 | Yamai et al. ............. 318/400.01 |
| 6,781,333 B2 * | 8/2004 | Koide et al. .................. 318/432 |
| 6,927,551 B2 * | 8/2005 | Yoshimoto .................... 318/715 |
| 7,554,281 B2 * | 6/2009 | Satake et al. .................. 318/432 |
| 2006/0145652 A1 * | 7/2006 | Ta et al. ........................ 318/807 |

FOREIGN PATENT DOCUMENTS

| EP | 1 263 125 A2 | 12/2002 |
| JP | A-11-285288 | 10/1999 |
| JP | A-11-299297 | 10/1999 |

(Continued)

OTHER PUBLICATIONS

Office Action issued Jan. 18, 2011 in Japanese Application No. JP-2005-355087 (with translation).

*Primary Examiner* — Walter Benson
*Assistant Examiner* — Antony M Paul
(74) *Attorney, Agent, or Firm* — Oliff & Berridge, PLC

(57) ABSTRACT

In the rectangular-wave voltage control mode, torque feedback control, in which the voltage phase of the rectangular-wave voltage is adjusted based on the deviation of the torque estimated value from the torque command value, is performed. A torque estimation portion calculates the torque estimated value using the motor currents calculated based on the values detected by a current sensor and a rotational position sensor, as in the case of the PWM control mode. Namely, the same state quantity (quantity detected by the sensors) of the alternating-current motor is used in the motor control in both the rectangular-wave voltage control mode and the PWM control mode.

9 Claims, 10 Drawing Sheets

FOREIGN PATENT DOCUMENTS

| | | |
|---|---|---|
| JP | A-2000-050689 | 2/2000 |
| JP | A-2000-270558 | 9/2000 |
| JP | A-2004-007900 | 2/2004 |
| JP | A-2005-117756 | 4/2005 |
| JP | A-2005-124359 | 5/2005 |
| JP | A-2005-168115 | 6/2005 |
| WO | WO 2005/013473 A1 | 2/2005 |
| WO | WO 2005/112249 | 11/2005 |

* cited by examiner

F I G . 2

| CONTROL | PWM CONTROL MODE | | RECTANGULAR-WAVE VOLTAGE CONTROL MODE |
|---|---|---|---|
| | SINE-WAVE PWM CONTROL | OVERMODULATION PWM CONTROL | RECTANGULAR-WAVE VOLTAGE CONTROL (1 PULSE) |
| WAVEFORM OF VOLTAGE OUTPUT FROM INVERTER | FUNDAMENTAL WAVE COMPONENT | FUNDAMENTAL WAVE COMPONENT | FUNDAMENTAL WAVE COMPONENT |
| MODULATION RATE | 0~0.61 | 0.61~0.78 | 0.78 |
| CHARACTERISTICS | SMALL TORQUE FLUCTUATION | INCREASE IN OUTPUT IN MEDIUM SPEED RANGE | INCREASE IN OUTPUT IN HIGH SPEED RANGE |

CONTROL APPARATUS AND METHOD FOR MOTOR DRIVE SYSTEM

INCORPORATION BY REFERENCE

The disclosure of Japanese Patent Application No. 2005-355087 filed on Dec. 8, 2005, including the specification, drawings and abstract is incorporated herein by reference in its entirety.

BACKGROUND OF THE INVENTION

1. Field of the Invention

The invention relates generally to a control apparatus and method for a motor drive system. More specifically, the invention relates to a control apparatus and method for a motor drive system that converts a direct-current voltage to an alternating-current voltage using an inverter to drive and control an alternating-current motor.

2. Description of the Related Art

A motor drive system that converts a direct-current voltage to an alternating-current voltage using an inverter to drive and control a three-phase alternating-current motor is commonly used. Various control modes for appropriately controlling the torque output from the alternating-current motor to a target torque (a torque command value) in such a motor drive system have been proposed.

For example, Japanese Patent Application Publication JP-A-2005-124359 describes a method in which a current signal estimated by an observer having a correction term, which is used to correct an error between the actual speed and the estimated speed, is used in current feedback in the current control for a synchronous motor. In the current control, a torque voltage command is prepared based on a torque current command value (a command value for a d-axis current Id) and a current feedback signal. According to Japanese Patent Application Publication JP-A-2005-124359, a voltage applied to each phase of a synchronous motor (an alternating-current motor) is generated, according to the above-mentioned current feedback, by a switching operation performed in an inverter according to the pulse-width modulation (PWM) control. In order to efficiently drive the motor, PWM control is usually performed by performing vector control.

However, only limited line voltage of the fundamental-wave is obtained by the PWM control. Japanese Patent Application Publication JP-A-11-299297, therefore, describes switching the motor control mode, depending on the situation, between the normal PWM control mode and the control mode in which a rectangular-wave voltage with the PWM duty ratio fixed to the maximum value is applied to a motor and the torque output from the motor is controlled by controlling the phase of the rectangular-wave voltage (the rectangular-wave voltage control mode).

According to the motor control mode described in Japanese Patent Application Publication JP-A-2005-124359, the control can be performed more efficiently, because an electric current is estimated accurately and an induced voltage is compensated for. However, the motor control mode is fixed to the PWM control mode. Accordingly, it is difficult to always obtain a high output regardless of the operating states of the motor.

In order to address such inconvenience, Japanese Patent Application Publication JP-A-11-299297 describes switching the motor control mode between the PWM control mode and the rectangular-wave voltage control mode. With such configuration, some measures need to be taken so that fluctuations do not occur in the torque output from the motor when the control mode is switched. However, there is no description concerning such measures in Japanese Patent Application Publication JP-A-11-299297.

SUMMARY OF THE INVENTION

The invention is made in light of the above-described circumstances. The invention, therefore, provides a control apparatus and method for a motor drive system having a control configuration in which the control mode is switched between the pulse-width modulation (PWM) control mode and the rectangular-wave voltage control mode, the control apparatus and method making it possible to appropriately control the output torque when the control mode is switched.

A first aspect of the invention relates to a control apparatus for a motor drive system including an inverter that drives an alternating-current motor. The control apparatus includes a current detector, a position detector, a control mode selection device, a first motor control device, and a second motor control device. The current detector detects a motor current flowing to the alternating-current motor. The position detector detects a rotational position of the alternating-current motor. The control mode selection device selects the control mode for voltage conversion performed in the inverter based on the operating state of the alternating-current motor. When the control mode selection device selects the first control mode, in which a rectangular-wave voltage is applied to the alternating-current motor, the first motor control device performs torque control by performing feedback control, in which the phase of the rectangular-wave voltage is adjusted based on the deviation of the torque output from the alternating-current motor from the torque command value. When the control mode selection device selects the second control mode, in which the voltage applied to the alternating-current motor is controlled in the pulse-width modulation mode, the second motor control device performs torque control by performing feedback control on the motor current based on the current command value corresponding to the torque command value. The second motor control device performs the feedback control on the motor current based on the outputs from the current detector and the position detector. The first motor control device includes first torque estimation device, voltage phase control device, and first voltage control device. The first torque estimation device estimates the torque output from the alternating-current motor based on the outputs from the current detector and the position detector. The voltage phase control device determines the phase of the rectangular-wave voltage based on the deviation of the torque estimated by the first torque estimation device from the torque command value. The first voltage control device controls voltage conversion performed in the inverter so that the rectangular-wave voltage with the phase determined by the voltage phase control device is applied to the alternating-current motor.

A second aspect of the invention relates to a control method for a motor drive system including an inverter that drives an alternating-current motor. According to the control method, a motor current flowing to the alternating-current motor is detected, a rotational position of the alternating-current motor is detected, and the control mode for voltage conversion performed in the inverter is selected based on the operating state of the alternating-current motor. When the first control mode, in which a rectangular-wave voltage is applied to the alternating-current motor, is selected, torque control is performed by performing feedback control, in which the phase of the rectangular-wave voltage is adjusted based on the deviation of the torque output from the alternating-current motor from the torque command value. At this time, the torque output from the alternating-current motor is estimated based on the outputs from the current detector and the position detector, the phase of the rectangular-wave voltage is determined based on the deviation of the estimated torque from the torque command value, and voltage conversion performed in the inverter is controlled so that the rectangular-wave voltage with the determined phase is applied to the alternating-current motor. When the second control mode, in which the voltage applied to the alternating-current motor is controlled in the pulse-width modulation mode, is selected, torque control is performed by performing feedback control on the motor current based on the current command value corresponding to the torque command value. At this time, the feedback control is performed on the motor current based on the detected motor current and the detected rotational position.

With the control apparatus and method for a motor drive system described above, in both the first motor control mode, which is the rectangular-wave voltage control mode, and the second motor control mode, which is the PWM control mode, torque control is performed by performing feedback control using the outputs from the current detector and the position detector as the motor state quantity. Accordingly, the state quantity (the outputs from the detectors) used to control the motor does not change between the control modes. Therefore, the output torque is appropriately controlled when the control mode is switched. Especially, it is possible to prevent a stepwise torque fluctuation due to an error in detection by the detector.

The current detector may be provided so as to detect currents flowing to respective phases of the alternating-current motor. In addition, the first torque estimation device may estimate the torque output from the alternating-current motor based on the d-axis current and the q-axis current for the alternating-current motor, which are calculated based on the outputs from the current detector and the position detector.

The torque output from the alternating-current motor may be estimated based on the d-axis current and the q-axis current for the alternating-current motor.

With the control apparatus and method for a motor drive system described above, the torque output from the alternating-current motor in the first motor control mode, which is the rectangular-wave voltage control mode, is estimated based on the d-axis current (Id) and the q-axis current (Iq) in the vector control that is commonly used in the second control mode, which is the PWM control mode. Thus, the rectangular-wave voltage control is performed in a manner similar to the manner in which the PWM control is performed.

Further, the first torque estimation device may estimate the torque output from the alternating-current motor based on the d-axis current and the q-axis current and the motor constant of the alternating-current motor, and the control apparatus may further include constant correction device that corrects the motor constant based on the d-axis current and the q-axis current.

The torque output from the alternating-current motor may be estimated based on the d-axis current and the q-axis current and the motor constant of the alternating-current motor, and the motor constant may be corrected based on the d-axis current and the q-axis current.

With the control apparatus and method for a motor drive system described above, the torque output from the alternating-current motor is estimated after a change in the motor constant (more specifically, the d-axis inductance and the q-axis inductance) due to a change in the motor currents (the d-axis current and the q-axis current) is compensated for. Thus, accuracy in estimating the torque in the rectangular-wave voltage control mode is increased, and, consequently, the torque is controlled more appropriately.

In the control apparatus according to the first aspect of the invention, the second motor control device may include second torque estimation device, a torque command value modification device, a current command preparation device, and a second voltage control means. The second torque estimation device estimates the torque output from the alternating-current motor based on the outputs from the current detector and the position detector in a manner similar to the manner in which the first torque estimation device estimates the torque output from the alternating-current motor. The torque command value modification device modifies the torque command value based on the deviation of the torque estimated by the second torque estimation device from the torque command value. The current command preparation device prepares the current command value based on the torque command value modified by the torque command value modification device. The second voltage control device controls voltage conversion performed in the inverter so that the voltage applied to the alternating-current motor is controlled based on the deviation of the motor current based on the value detected by the current detector from the current command value prepared by the current command preparation device.

When the second control method is selected, the torque output from the alternating-current motor may be estimated based on the detected motor current and the detected rotational position in a manner similar to the manner of the torque estimation described above, and the torque command value may be modified based on the deviation of the estimated torque from the torque command value. Then, the current command value may be prepared based on the modified torque command value, and voltage conversion performed in the inverter may be controlled so that the voltage applied to the alternating-current motor is controlled based on the deviation of the detected motor current from the prepared current command value.

With the control apparatus and method for a motor drive system described above, even in the PWM control mode, the feedback control is performed on the motor current based on the torque deviation, as in the case of the rectangular-wave voltage control mode. Thus, the motor current is controlled so that a change in the motor output characteristics due to a change in the temperature is compensated for. As a result, a torque fluctuation is prevented without providing a temperature sensor, etc. Also, in both the PWM control mode and the rectangular-wave voltage control mode, the torque feedback control is performed using the output torque estimated in the method common to these control modes. As a result, it is possible to further reliably prevent a torque fluctuation that is likely to occur when the control mode is switched.

The second control mode may include the sine-wave pulse-width modulation mode in which the modulation rate falls within the range from 0 to 0.61, and the overmodulation pulse-width modulation mode in which the fundamental wave component is deformed so that the modulation rate falls within the range from 0.61 to 0.78.

With the control apparatus and method for a motor drive system described above, the control mode is switched among the common sine-wave pulse-width modulation (PWM) control mode, the overmodulation PWM control mode, and the rectangular-wave voltage control mode based on the operating state (typically, the torque and the rotational state) of the alternating-current motor. As a result, the output from the alternating-current motor in the medium rotational speed range and the high-rotational speed range is increased.

A third aspect of the invention relates to a control apparatus for a motor drive system including an inverter that drives an alternating-current motor. The control apparatus includes control mode selection device, and a multiple motor control device. The control mode selection device selects the control mode for the inverter from among multiple control modes based on the operating state of the alternating-current motor. The multiple motor control device is provided so as to correspond to the respective multiple control modes, and control the torque output from the alternating-current motor in the control mode selected by the control mode selection device. The estimated output torque is used to control the torque output from the alternating-current motor, and output torque estimation is performed in the manner common to the multiple control modes in the motor control device.

A fourth aspect of the invention relates to a control method for a motor drive system including an inverter that drives an alternating-current motor. According to the control method, the control mode for the inverter is selected from among the multiple control modes based on the operating state of the alternating-current motor, and the torque output from the alternating-current motor is controlled in the selected control mode. The estimated torque is used to control the torque output from the alternating-current motor, and the torque output from the alternating-current motor is estimated in a manner common to the multiple control modes.

With the control apparatus and method for a motor drive system described above, the torque estimation method is common to the multiple control modes in which the torque control is performed using the estimated output torque. Accordingly, it is possible to prevent a torque fluctuation that is likely to occur when the control mode is switched.

The alternating-current motor may be a permanent magnet motor in which a permanent magnet is fitted to a rotor.

With the control apparatus for a motor drive system described above, in the configuration where the permanent magnet motor, which is suitable for size reduction and increases in efficiency, is a load, a change in the motor output characteristics due to a change in the temperature of the permanent magnet is compensated for. As a result, a torque fluctuation is prevented.

The invention provides the control apparatus and method for a motor drive system having the control configuration in which the control mode is switched between the pulse-width modulation (PWM) control mode and the rectangular-wave voltage control mode, the control apparatus and method making it possible prevent an output torque fluctuation that is likely to occur when the control mode is switched, thereby appropriately controlling the torque.

BRIEF DESCRIPTION OF THE DRAWINGS

The features, advantages thereof, and technical and industrial significance of the invention will be better understood by reading the following detailed description of example embodiment of the invention, when considered in connection with the accompanying drawings, in which

FIG. 2 is the table showing the control modes used in the motor drive system according to the embodiment of the invention;

DETAILED DESCRIPTION OF THE EXAMPLE EMBODIMENT

Figure 1:
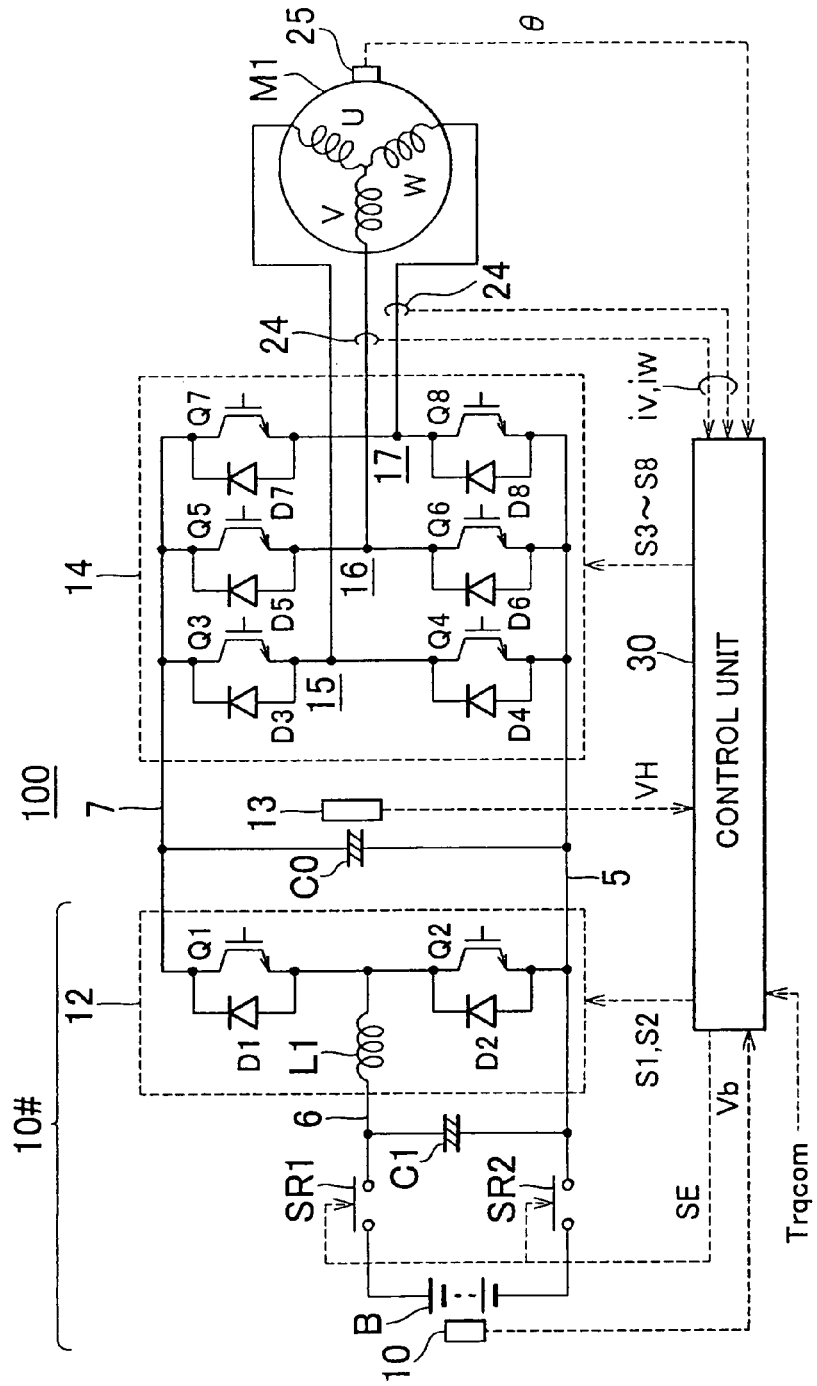
FIG. 1 is the view showing the entire configuration of a motor drive system according to an embodiment of the invention.

In the following description and accompanying drawings, the invention will be described in more detail with reference to an example embodiment. The same or corresponding portions will be denoted by the same reference numerals, and will be described basically only once.

FIG. 1 is the view showing the entire configuration of a motor drive system according to an embodiment of the invention. As shown in FIG. 1, a motor drive system 100 according to the embodiment of the invention includes a direct-current voltage generation portion 10#, a smoothing capacitor C0, an inverter 14, and an alternating-current motor M1.

The alternating-current motor M1 is a drive motor that generates a torque for driving drive wheels of a hybrid vehicle or an electric vehicle. Alternatively, the alternating-current motor M1 may be configured to serve as an electric power generator driven by an engine. The alternating-current motor M1 may be configured to serve both as an electric motor and an electric power generator. The alternating-current motor M1 may serve as electric motor for the engine, and be mounted in the hybrid vehicle as a component that can start the engine.

The direct-current voltage generation portion 10# includes a direct-current power source B that can be charged with electric power, system relays SR1 and SR2, a smoothing capacitor C1, and a step-up/down converter 12.

The direct-current power source B may be formed of a secondary battery such as a nickel hydride battery or a lithium-ion battery. Alternatively, the direct-current power source B may be formed of an electric storage device such as an electric double layer capacitor. The direct-current voltage Vb output from the direct-current power source B is detected by a voltage sensor 10. The voltage sensor 10 outputs the signal indicating the direct-current voltage Vb to a control unit 30.

The system relay SR1 provides connection between the positive terminal of the direct-current power supply B and an electric power line 6. The system relay SR2 provides connection between the negative terminal of the direct-current power supply B and an earth cable 5. The system relays SR1 and SR2 are activated/deactivated in response to the signal SE from a control unit 30. More specifically, the system relays SR1 and SR2 are activated in response to the signal SE at the high logic level from the control unit 30, and deactivated in response to the signal SE at the low logic level from the control unit 30. The smoothing capacitor C1 is arranged between the electric-power line 6 and the earth cable 5, and connected to the electric power line 6 and the earth cable 5.

The step-up/down converter 12 includes a reactor L1, electric power semi-conductor switching elements Q1 and Q2, and diodes D1 and D2.

The electric power semi-conductor switching elements Q1 and Q2 are arranged between an electric power line 7 and the earth cable 5, connected to the electric power line 7 and the earth cable 5, and connected to each other in series. The electric power semi-conductor switching elements Q1 and Q2 are activated/deactivated in response to the switching signals S1 and S2, respectively, from the control unit 30.

Examples of the electric power semi-conductor switching element (hereinafter, simply referred to as the "switching element") that may be used in the embodiment of the invention include an IGBT (Insulated Gate Bipolar Transistor), an electric power MOS (Metal Oxide Semiconductor) transistor, and an electric power bipolar transistor. Antiparallel diodes D1 and D2 are arranged so as to correspond to the switching elements Q1 and Q2, respectively.

The reactor L1 is arranged between the node at which the switching elements Q1 and Q2 are connected to each other and the electric power line 6, and connected to the node and the electric power line 6. The smoothing capacitor C0 is arranged between the electric power line 7 and the earth cable 5, and connected to the electric power line 7 and the earth cable 5.

The inverter 14 includes a U-phase arm 15, a V-phase arm 16, and a W-phase arm 17 that are arranged between the electric power line 7 and the earth cable 5 in parallel. Each of The U-phase arm 15, the V-phase arm 16, and the W-phase arm 17 is formed of switching elements that are arranged between the electric power line 7 and the earth cable 5 and connected to each other in series. For example, the U-phase arm 15 is formed of switching elements Q3 and Q4, the V-phase arm 16 is formed of switching elements Q5 and Q6, and the W-phase arm 17 is formed of switching elements Q7 and Q8. Antiparallel diodes D3 to D8 are connected to the switching elements Q3 to Q8, respectively. The switching elements Q3 to Q8 are activated/deactivated in response to the switching signals S3 to S8, respectively, from the control unit 30.

The midpoints of the U-phase arm 15, the V-phase arm 16 and the W-phase arm 17 are connected to the ends of the U-phase coil, the v-phase coil and the W-phase coil of the alternating-current motor M1, respectively. Usually, the alternating-current motor M1 is a three-phase permanent-magnet motor. In the alternating-current motor M1, one ends of the U-phase coil, the V-phase coil and the W-phase coil are connected to each other at the neutral point. The other ends of the U-phase coil, the V-phase coil and the W-phase coil are connected to the midpoints of the U-phase arm 15, the V-phase arm 16, and the W-phase arm 17, respectively.

During the step-up operation, the step-up/down converter 12 increases the direct-current voltage Vb supplied from the direct-current power source B, and supplies the increased direct-current voltage (hereinafter, the direct-current voltage, which corresponds to the voltage input in the inverter 14, will be sometimes referred to as the "system voltage") to the inverter 14. More specifically, the period during which switching element Q1 is activated and the period during which the switching element Q2 is activated are alternately set in response to the switching control signals S1 and S2 from the control unit 30. The pressure increase ratio corresponds to the ratio of the periods during which the switching element Q1 and Q2 are activated to the entire period.

During the step-down operation, the step-up/down converter 12 decreases the direct-current voltage (system voltage) supplied from the inverter 14 via the smoothing capacitor C0, and supplies the decreased direct-current voltage to the direct-current power supply B. More specifically, the period during which only the switching element Q1 is activated and the period during which both of the switching elements Q1 and Q2 are deactivated are alternately set in response to the switching signals S1 and S2 from the control unit 30. The pressure decrease ratio corresponds to the ratio of the period during which the switching element Q1 is activated to the entire period.

The smoothing capacitor C0 smoothes the direct-current voltage from the step-up/down converter 12, and supplies the smoothed direct-current voltage to the inverter 14. The voltage sensor 13 detects the voltage between both ends of the smoothing capacitor C0, namely, the system voltage, and outputs the signal indicating the detected value VH to the control unit 30.

In the case where the torque command value for the alternating-current motor M1 is a positive value (Trqcom>0), when the direct-current voltage is supplied from the smoothing capacitor C0 to the inverter 14, the inverter 14 converts the direct-current voltage into the alternating-current voltage by activating/deactivating the switching elements Q3 to Q8 in response to the respective switching control signals S3 to S8 from the control unit 30, and drives the alternating-current motor M1 so that the alternating-current motor M1 outputs a positive torque. Alternatively, in the case where the torque command value for the alternating-current motor M1 is zero (Trqcom=0), the inverter 14 converts the direct-current voltage to the alternating-current voltage by activating/deactivating the switching elements Q3 to Q8 in response to the respective switching control signals S3 to S8, and drives the alternating-current motor M1 so that the torque output from the alternating-current motor M1 is zero. Thus, the alternating-current motor M1 is driven to generate a torque equal to zero or a positive torque, which is designated by the torque command value Trqcom.

When a regenerative braking operation is performed in the hybrid vehicle or the electric vehicle including the motor drive system 100, the torque command value Trqcom for the alternating-current motor M1 is set to a negative value (Trqcom<0). In this case, the inverter 14 converts the alternating-current voltage generated by the alternating-current motor M1 into the direct-current voltage by activating/deactivating the switching elements Q3 to Q8 in response to the respective switching control signals S3 to S8, and supplies the direct-current voltage (system voltage) to the step-up/down converter 12 via the smoothing capacitor C0. Examples of the regenerative braking operation in this case include the braking operation along with the regenerative electric power generation, which is performed when a driver driving the hybrid vehicle or the electric vehicle operates a foot brake, and deceleration of the vehicle (or cancellation of acceleration) along with the regenerative electric power generation due to a release of an accelerator pedal, instead of the operation of the foot brake, while the vehicle is running.

Current sensors 24 detect motor currents flowing to the alternating-current motor M1, and output the signals indicating the detected motor currents to the control unit 30. The sum of the instantaneous values of the three-phase currents iu, iv, and iw is 0. Accordingly, providing two current sensors 24 to detect the motor currents flowing to the two phases of the alternating-current motor M1 (for example, the V-phase current iv and the W-phase current iw) is enough.

A rotational angle sensor (resolver) 25 detects the rotational angle θ of the rotor of the alternating-current motor M1, and transmits the signal indicating the rotational angle θ to the control unit 30. The control unit 30 calculates the rotational speed of the alternating-current motor M1 based on the rotational angle θ.

The control unit 30 controls the operations of the step-up/down converter 12 and the inverter 14, based on the torque command value Trqcom indicated by the signal received from an external electronic control unit (a higher-level ECU, not shown), the battery voltage Vb detected by the voltage sensor 10, the system voltage VH detected by the voltage sensor 13, the motor currents iv, iw indicated by the signals from the current sensors 24, and the rotational angle θ indicated by the signal from the rotational speed sensor 25, so that the alternating-current motor M1 outputs the torque corresponding to the torque command value Trqcom according to the method described later. Namely, the control unit 30 prepares the switching control signals S1 and S2 for controlling the step-up/down converter 12 in the above-described manner and the switching control signals S3 to S8 for controlling the inverter 14 in the above-described manner, and outputs the control signals S1 and S2 to the step-up/down converter 12 and the control signals S3 to S8 to the inverter 14.

During the step-up operation performed by the step-up/down converter 12, the control unit 30 controls the output voltage VH from the smoothing capacitor C0 in a feedback manner, and prepares the switching control signals S1 and S2 based on which the output voltage VH matches the voltage command value.

When receiving the signal RGE, which indicates that the hybrid vehicle or the electric vehicle is placed in the regenerative braking mode, from the external ECU, the control unit 30 prepares the switching control signals S3 to S8 based on which the alternating-current voltage generated by the alternating-current motor M1 is converted into the direct-current voltage, and outputs the switching control signals S3 to S8 to the inverter 14. Then, the inverter 14 converts the alternating-current voltage generated by the alternating-current motor M1 into the direct-current voltage, and supplies the direct-current voltage to the step-up/down converter 12.

When receiving the signal RGE, which indicates that the hybrid vehicle or the electric vehicle is placed into the regenerative braking mode, from the external ECU, the control unit 30 prepares the switching control signals S1 and S2 based on which the direct-current voltage supplied from the inverter 14 is decreased, and outputs the switching control signals S1 and S2 to the step-up/down converter 12. Then, the alternating-current voltage generated by the alternating-current motor M1 is converted into the direct-current voltage, decreased, and then supplied to the direct-current power supply B.

In addition, the control unit 30 prepares the signal SE for activating/deactivating the system relays SR1 and SR2, and outputs the signal SE to the system relays SR1 and SR2.

Next, electric power conversion, performed in the inverter 14 and controlled by the control unit 30, will be described in detail.

As shown in FIG. 2, in the motor drive system 100 according to the embodiment of the invention, the control mode for the voltage conversion performed in the inverter 14 is switched among the three control modes, that are, the sine-wave PWM control mode, the overmodulation PWM control mode, and the rectangular-wave voltage control mode.

The sine-wave PWM control mode is used as the common PWM control mode. In the sine-wave PWM control mode, activation/deactivation of the switching elements in each of the U-phase arm, the V-phase arm and the W-phase arm is controlled based on a comparison in the voltage between the sine-wave voltage command value and the carrier wave (typically, the triangular wave). As a result, the duty ratio is controlled so that the fundamental wave component of the integrated waveform obtained by integrating the waveform in the high-level period, which corresponds to the period during which the upper arm element is activated, and the waveform in the low-level period, which corresponds to the period during which the lower arm element is activated, becomes a sine-wave in a predetermined period. As is well known, in the sine-wave PWM control, the amplitude of the fundamental wave component is increased only to 0.61 times as high as the voltage input in the inverter.

On the other hand, in the rectangular-wave voltage control, one pulse of the rectangular-wave, where the ratio between the high level period and the low level period is 1:1, which corresponds to the ratio when the PWM duty ratio is maintained at the maximum value, is applied to the alternating-current motor M1 in the predetermined period. Thus, the modulation rate is increased to 0.78.

In the overmodulation PWM control, the fundamental wave component is deformed to reduce the amplitude of the carrier wave, and then the PWM control similar to the sine-wave PWM control is performed. The modulation rate is increased to a value in a range from 0.61 to 0.78 by deforming the fundamental wave component. In the embodiment of the invention, both of the sine-wave PWM control mode, which is the normal PWM control mode, and the overmodulation PWM control mode are classified into the PWM control mode.

In the alternating-current motor M1, the induced voltage increases with increases in the rotational speed and the output torque, which also increases the required voltage. The increased voltage achieved by the converter 12, namely, the system voltage VH needs to be higher than the voltage required by the motor (hereinafter, referred to as the "motor required voltage") (induced voltage). Meanwhile, there is a limit value (VH maximum voltage) in the increased voltage achieved by the converter 12, namely, the system voltage.

Accordingly, in the range where the motor required voltage (induced voltage) is lower than the maximum value (VH maximum voltage) of the system voltage, the PWM control mode, that is, the sine-wave PWM control mode or the overmodulation PWM control mode is used, and the output torque is controlled to the torque command value Trqcom by the motor current control performed by performing the vector control.

When the motor required voltage (induced voltage) reaches the maximum value (VH maximum voltage) of the system voltage, the system voltage VH is maintained, and the rectangular-wave voltage control mode, that is, a type of a weak field control mode is used. In the rectangular-wave voltage control, the amplitude of the fundamental wave component is fixed. Accordingly, the torque is controlled by controlling the voltage phase of the rectangular-wave pulse based on the deviation of the actual torque value from torque command value, which is obtained by electric power calculation.

Figure 3:
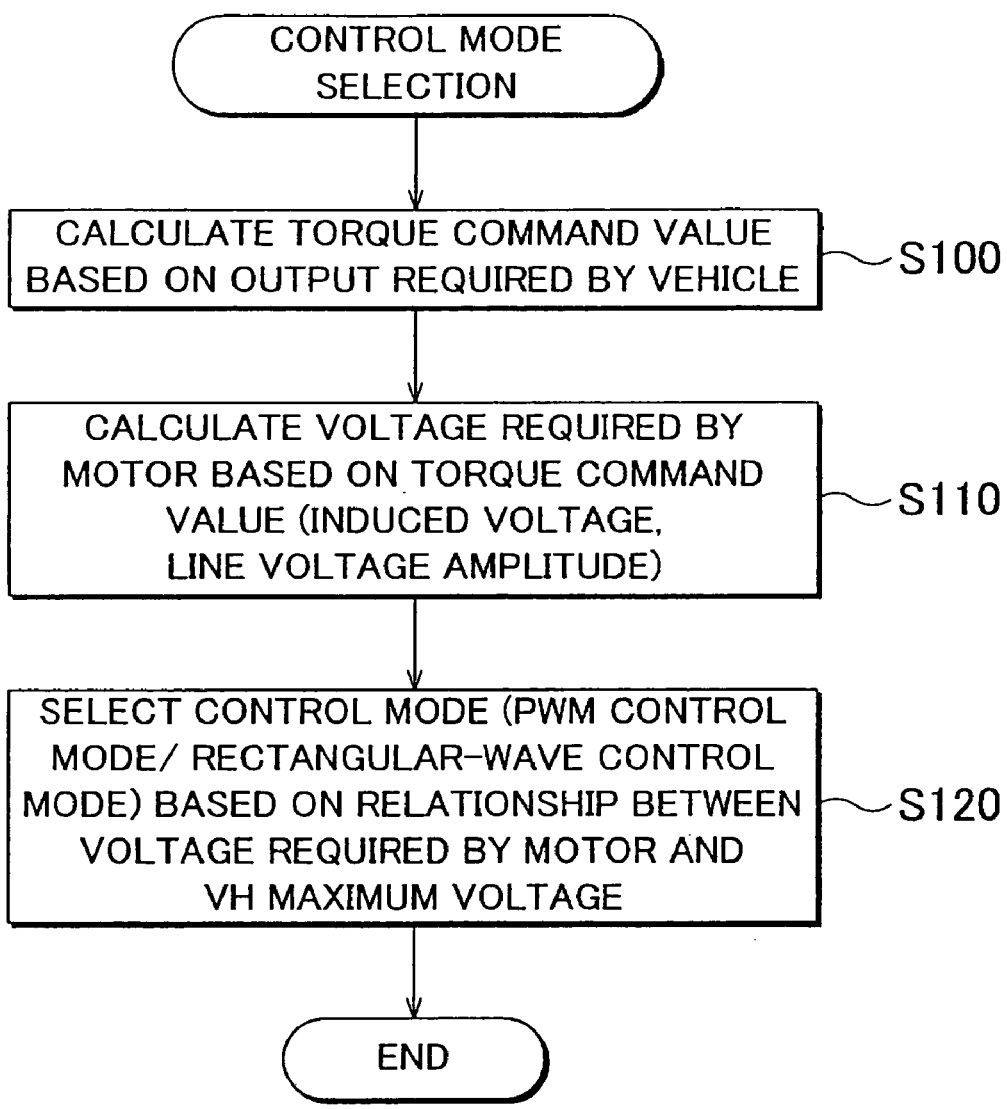
FIG. 3 is the flowchart for selecting the control mode.

As shown in the flowchart in FIG. 3, the higher-level ECU (not shown) calculates the torque command value Trqcom for the alternating-current motor M1 based on the output required by the vehicle according to the accelerator pedal operation amount, etc (step S100). Then, the control unit 30 calculates the motor required voltage (induced voltage) based on the torque command value Trqcom for the alternating-current motor M1 and the rotational speed of the alternating-current motor M1 using a predetermined map, etc. (step S110). Then, the control unit 30 determines, based on the relationship between the motor required voltage and the maximum value of the system voltage (VH maximum voltage), whether the rectangular-wave voltage control mode or the PWM control mode (the sine-wave PWM control mode or the overmodulation PWM control mode) is used to control the motor (step S120). When it is determined that the PWM control mode is used, whether the sine-wave PWM control mode or the overmodulation PWM control mode is used is determined based on the modulation rate range for the voltage command value according to the vector control. According to the flowchart, the appropriate control mode is selected from the multiple control modes shown in FIG. 2 based on the operating state of the alternating-current motor M1.

Figure 4:
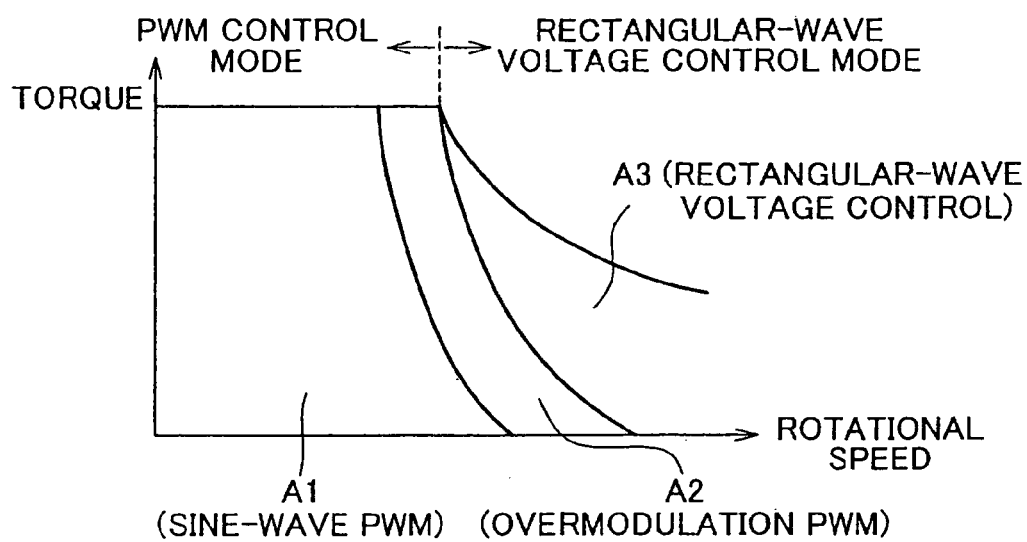
FIG. 4 is the graph showing the manner in which the control mode is switched based on the operating state of a motor.

As a result, as shown in FIG. 4, the sine-wave PWM control mode is used in the low rotational speed range A1 to reduce the torque fluctuation. The overmodulation PWM control mode is used in the medium rotational speed range A2. The rectangular-wave voltage control mode is used in the high rotational speed range A3. Especially, the output from the alternating-current motor M1 is increased by using the overmodulation PWM control mode and the rectangular-wave voltage control mode. As described so far, which control mode is selected from the multiple control modes in FIG. 2 is determined based on the range for the achievable modulation rate.

Figure 5:
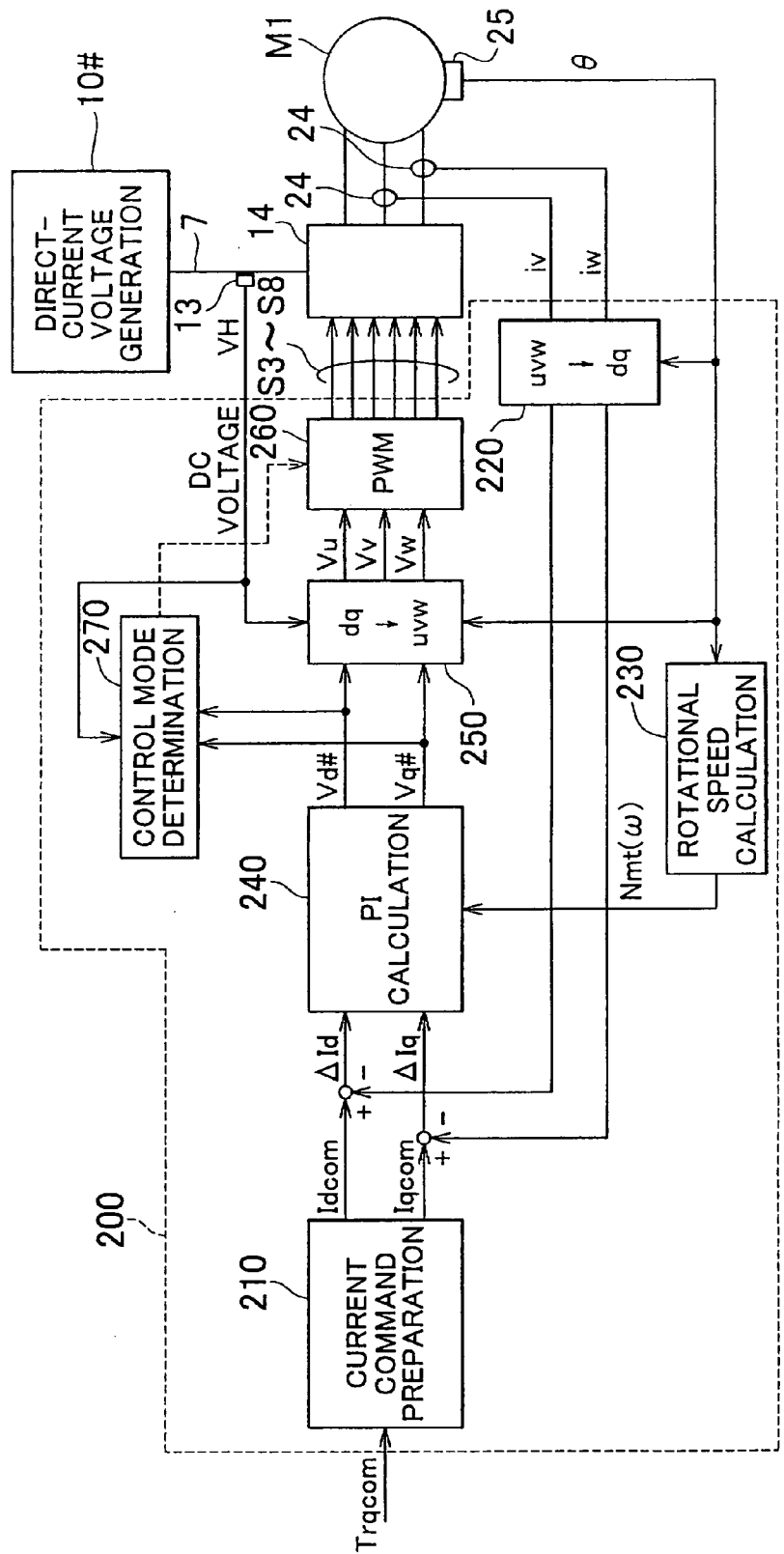
FIG. 5 is the control block diagram when the PWM control mode (the sine-wave PWM control mode and the overmodulation PWM control mode) is used in the motor drive system according to the embodiment of the invention.

FIG. 5 is the control block diagram when the PWM control is performed by the control unit 30. As shown in FIG. 5, a PWM control block 200 includes a current command preparation portion 210, coordinate conversion portions 220 and 250, a rotational speed calculation portion 230, a PI calculation portion 240, a PWM signal preparation portion 260, and a control mode determination portion 270.

The current command preparation portion 210 prepares the d-axis current command value Idcom and the q-axis current command value Iqcom corresponding to the torque command value Trqcom, using, for example, a table prepared in advance.

The coordinate conversion portion 220 calculates the d-axis current Id and the q-axis current Iq based on the V-phase current iv and the W-phase current iw detected by the current sensors 24 by performing coordinate conversion (three-phases to two-phases) using the rotational angle θ of the alternating-current motor M1 detected by the rotational angle sensor 25. The rotational speed calculation portion 230 calculates the rotational speed Nmt (or the rotational angular speed ω) of the alternating-current motor M1 based on the output from the rotational angle sensor 25.

The PI calculation portion 240 receives the signals indicating the deviation ΔId of the d-axis current Id from the command value Idcom (ΔId=Idcom−Id) and the deviation ΔIq of the q-axis current Iq from the command value Idcom (ΔIq=Iqcom−Iq). The PI calculation portion 240 obtains the control deviation by performing PI calculation, using a predetermined gain, on the d-axis current deviation ΔId and the q-axis current deviation ΔIq. The PI calculation portion 240 then prepares the d-axis voltage command value Vd# and the q-axis voltage command value Vq# corresponding to the control deviation.

The coordinate conversion portion 250 converts the d-axis voltage command value Vd# and the q-axis voltage command value Vq# to the voltage command values Vu, Vv, Vw for the respective U-phase, V-phase and W-phase by performing coordinate conversion (two-phases to three-phases) using the rotational angle θ of the alternating-current motor M1. The system voltage VH is reflected on conversion from the d-axis voltage command value Vd# and the q-axis voltage command value Vq# to the voltage command values Vu, Vv, and Vw for the respective U-phase, V-phase and W-phase.

If the PWM control mode (the sine-wave PWM control mode or the overmodulation PWM control mode) is selected according to the flowchart in FIG. 3, the control mode determination portion 270 selects one of the sine-wave PWM control mode and the overmodulation PWM control mode by calculating the modulation rate in the manner described below.

The control mode determination portion 270 calculates the line voltage amplitude Vamp according to the following equations (1), (2), using the d-axis voltage command value Vd# and the q-axis voltage command value Vq# prepared by the PI calculation portion 240.

$$\text{Vamp} = |Vd\#| \times \cos\phi + |Vq\#| \times \sin\phi \quad (1)$$

$$\tan\phi = Vq\#/Vd\# \quad (2)$$

The control mode determination portion 270 then calculates the modulation rate Kmd that is the ratio of the line voltage amplitude Vamp, obtained according to the above-mentioned equation, to the system voltage VH.

$$Kmd = \text{Vamp}/VH\# \quad (3)$$

The control mode determination portion 270 selects one of the sine-wave PWM control mode and the overmodulation PWM control mode based on the modulation rate Kmd obtained according to the above-mentioned equation. As described above, the control mode selected by the control mode determination portion 270 is reflected on switching of the carrier wave performed in the PWM signal preparation portion 260. Namely, when the overmodulation PWM control mode is selected, the carrier wave used in PWM modulation performed in the PWM signal preparation portion 260 is switched from a common carrier wave used in the sine-wave PWM control mode.

When the modulation rate Kmd obtained by the equation (3) exceeds the upper limit of the modulation rate that can be achieved in the PWM control mode, the control mode determination portion 270 may transmit the signal for promoting a change of the control mode to the rectangular-wave voltage control mode to the higher-level ECU (not shown).

The PWM signal preparation portion 260 prepares the switching control signals S3 to S8 shown in FIG. 1 based on the comparison between each of the voltage command values Vu, Vv, Vw for the respective U-phase, V-phase and the W-phase with the predetermined carrier wave. When the inverter 14 is controlled according to the switching signals S3 to S8 prepared by the PWM control block 200, the alternating-current voltage is applied so that the alternating-current motor M1 outputs the torque corresponding to the torque command value Trqcom input in the current command preparation portion 210.

Thus, a closed loop, through which the motor current is controlled to the current command value (Idcom, Iqcom) corresponding to the torque command value Trqcom, is formed. As a result, the torque output from the alternating-current motor M1 is controlled based on the torque command value Trqcom.

Figure 6:
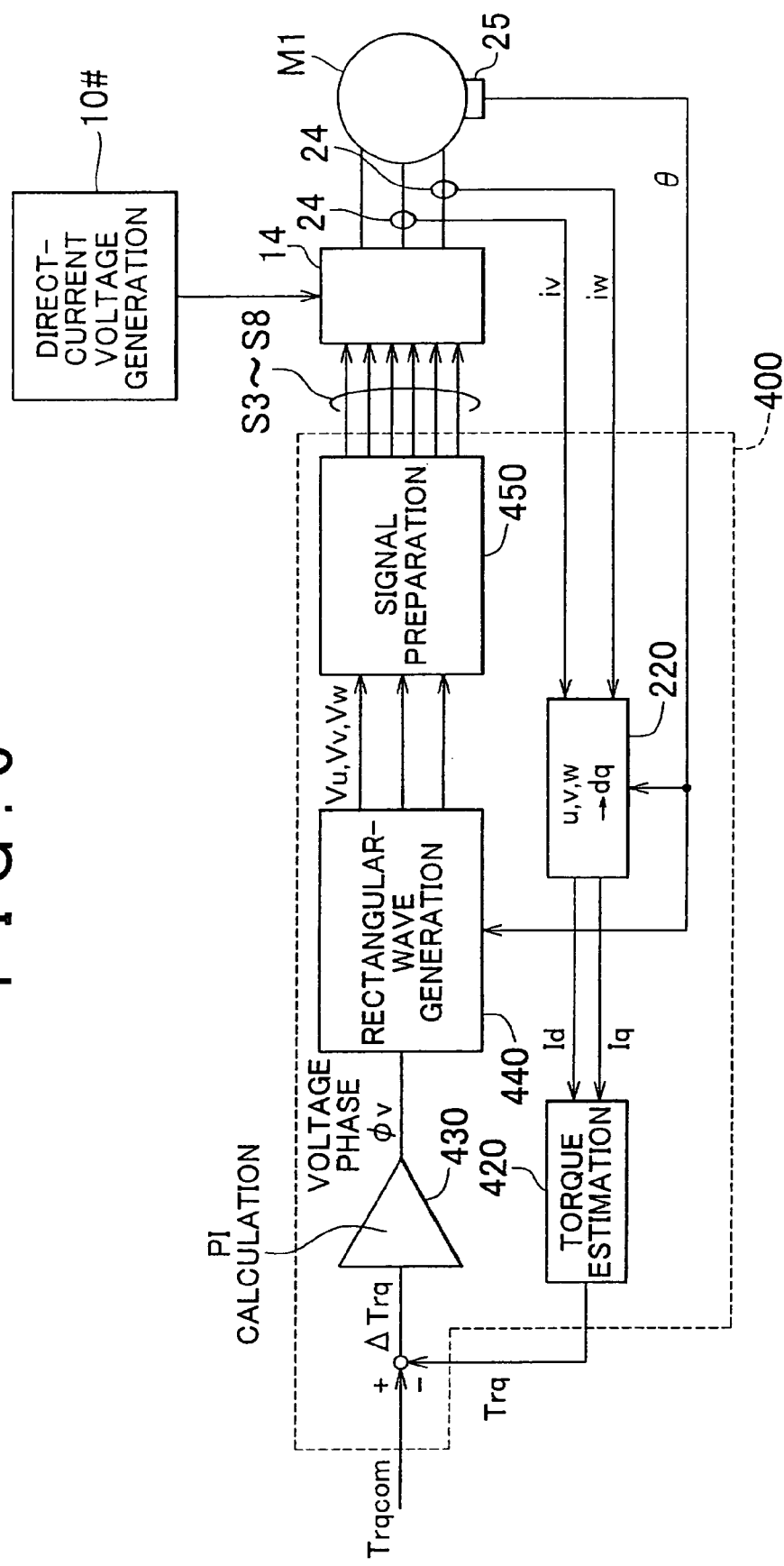
FIG. 6 is the control block diagram when the rectangular-wave voltage control mode is used in the motor drive system according to the embodiment of the invention.

Next, the control block diagram in the rectangular-wave voltage control mode will be described with reference to FIG. 6. As shown in FIG. 6, a rectangular-wave voltage control block 400 includes the coordinate conversion portion 220 that is the same as that used in the PWM control mode, a torque estimation portion 420, a PI calculation portion 430, a rectangular-wave generation portion 440, and a signal preparation portion 450.

The coordinate conversion portion 220, performs coordinate conversion so that the U-phase current, the V-phase current and the W-phase current, obtained based on V-phase current iv and the W-phase current iw detected by the current sensors 24, are converted into the d-axis current Id and the q-axis current Iq, as in the case of the PWM control mode.

The torque estimation portion 420 estimates the torque output from the alternating-current motor M1 using the d-axis current Id and the q-axis current Iq obtained by the coordinate conversion portion 220.

Figure 7:
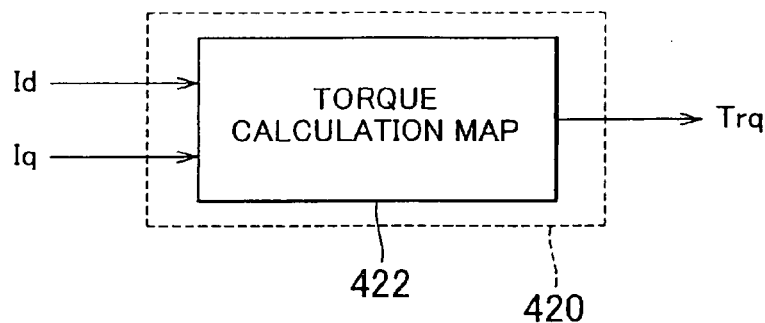
FIG. 7 is the first block diagram showing an example of the configuration of a torque calculation portion.

The torque estimation portion 420 is formed of a torque calculation map 422 that outputs the torque estimated value Trq, using the d-axis current Id and the q-axis current Iq as the arguments, as shown, for example, in FIG. 7.

Instead of using the map, the torque estimated value Trq may be calculated by the torque estimation portion 420 according to the following equation (4), which is the characteristic equation of the alternating-current motor M1.

$$Trq = Kt \times Iq + p \times (Ld - Lq) \times Id \times Iq \quad (4)$$

In the equation (4), "Kt" is the torque constant (Nm/A), "p" is the pole logarithm, "Ld" is the d-axis inductance (H), and "Lq" is the q-axis inductance (H). "Kt", "Ld", and "Lq" are uniquely determined as the circuit constants (motor constants) of the motor based on the configuration of the alternating-current motor M1.

Figure 8:
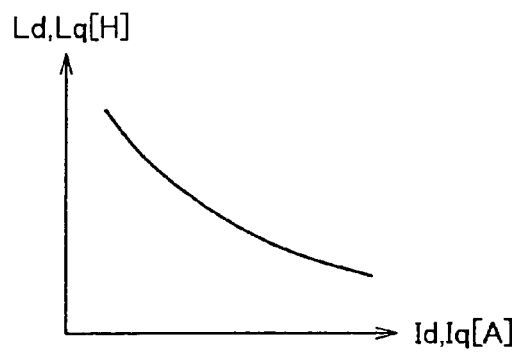
FIG. 8 is the graph showing a change in the motor constant with respect to the motor current in the torque calculating equation.

It is known that the d-axis inductance Ld and the q-axis inductance Lq, which are the motor constants in the equation (4), relatively decrease with increases in the d-axis current Id and the q-axis current Iq, respectively, as shown in FIG. 8. Therefore, the torque estimation portion 420 may be configured as shown in FIG. 9.

Figure 9:
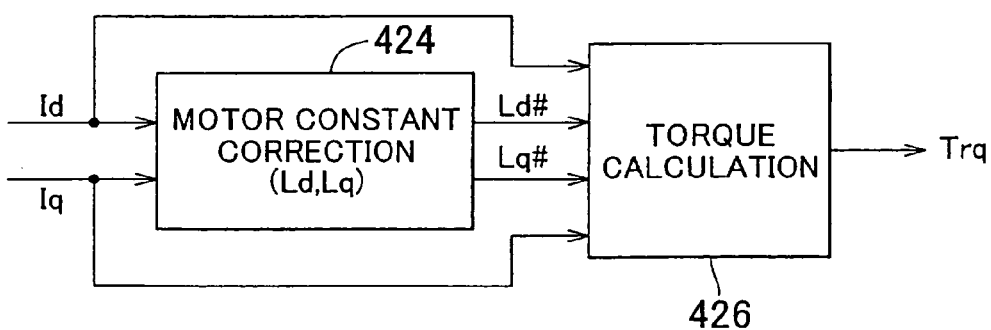
FIG. 9 is the second block diagram showing another example of the configuration of the torque calculation portion.

As shown in FIG. 9, the torque estimation portion 420 includes a motor constant correction portion 424 and a torque calculation portion 426.

The motor constant correction portion 424 is typically formed of a map that outputs the d-axis inductance Ld# and the q-axis inductance Lq# using the d-axis current Id and the q-axis current Iq as the arguments. The map is prepared so as to reflect the characteristics shown in FIG. 8. The torque calculation portion 426 calculates the torque estimated value Trq according to the equation (5), using the d-axis inductance Ld# and the q-axis inductance Lq# that are the motor constants corrected by the motor constant correction portion 424.

$$Trq = Kt \times Iq + p \times (Ld\# - Lq\#) \times Id \times Iq \quad (5)$$

The motor constant is corrected based on the motor currents Id and Iq, and the torque is estimated using the corrected motor constants. As a result, the accuracy in estimation of the torque is enhanced, and, consequently, the output torque is controlled more appropriately.

Referring again to FIG. 6, the PI calculation portion 430 receives the signal indicating the deviation ΔTrq (ΔTrq=Trqcom−Trq) of the torque estimated value Trq from the torque command value Trqcom. The PI calculation portion 430 obtains the control deviation by performing the PI calculation on the torque deviation ΔTrq using a predetermined gain, and sets the phase φv of the rectangular-wave voltage based on the obtained control deviation. More specifically, when the torque command value Trqcom is a positive value (Trqcom>0), if the torque is insufficient, the voltage phase is advanced. On the other hand, if the torque is excessive, the voltage phase is retarded. When the torque command value Trqcom is a negative value (Trqcom<0), if the torque is insufficient, the voltage phase is retarded. On the other hand, if the torque is excessive, the voltage phase is advanced.

The rectangular-wave generation portion 440 prepares the phase voltage command values (rectangular-wave pulses) Vu, Vv, and Vw based on the voltage phase φv set by the PI calculation portion 430. The signal preparation portion 450 prepares the switching control signals S3 to S8 based on the phase voltage command values Vu, Vv, and Vw. When the inverter 14 performs the switching operations based on the switching control signals S3 to S8, the rectangular-wave pulse generated based on the voltage phase φv is applied as each phase voltage of the motor.

In the rectangular-wave voltage control block 400 shown in FIG. 6, the torque estimated value Trq, used in the torque feedback control, is calculated based only on the outputs from the current sensors 24 and the position sensor 24, as in the case of the PWM control shown in FIG. 5. Accordingly, even when the control mode is switched between the PWM control mode and the rectangular-wave voltage control mode, the state quantity (quantity detected by the sensors) of the alternating-current motor, which used in the motor control, does not change.

Figure 10:
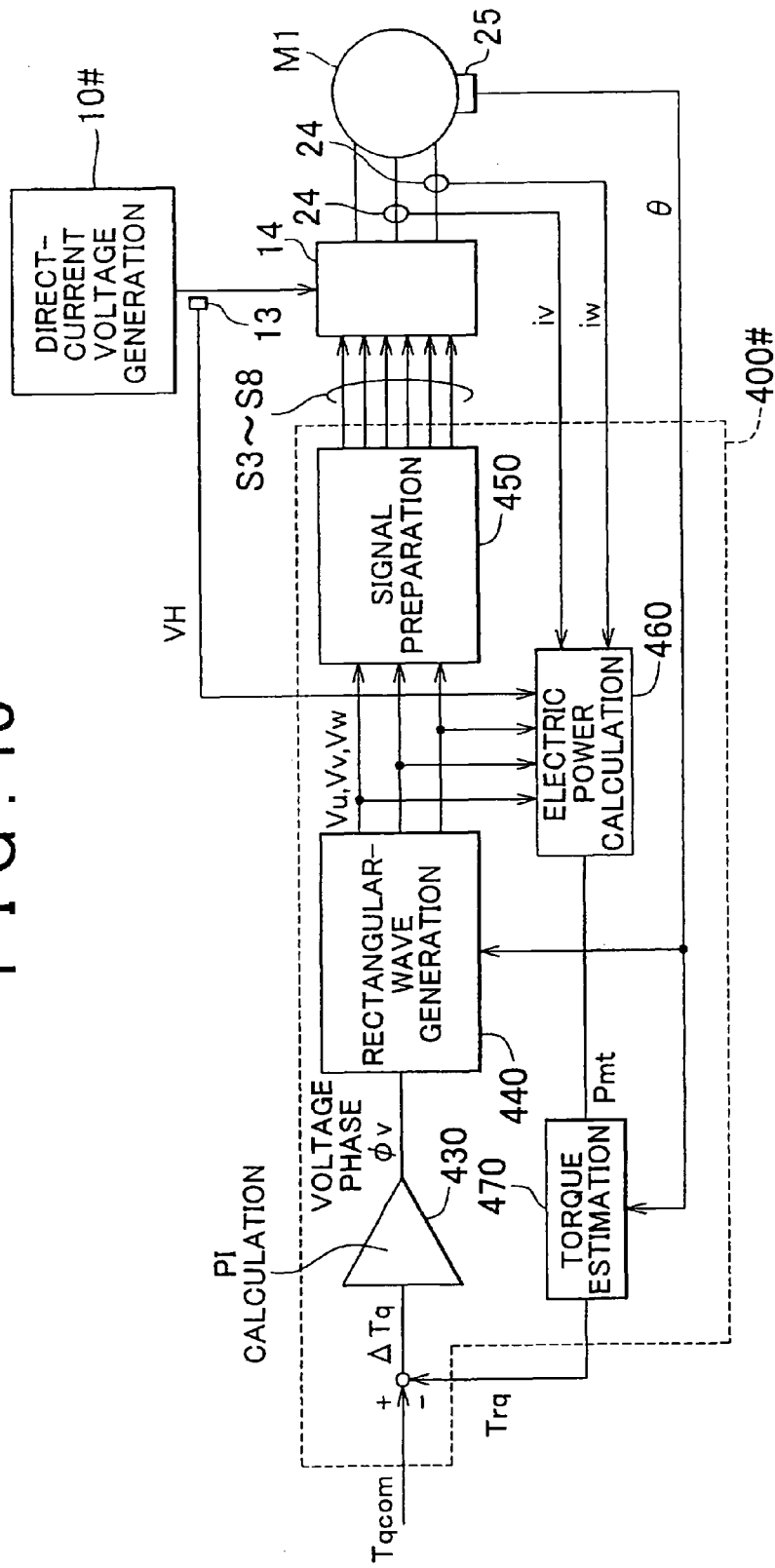
FIG. 10 is the control block diagram showing the rectangular-wave voltage control mode used as a comparative example.

FIG. 10 shows a rectangular-wave voltage control block 400# that is used as an example compared with the rectangular-wave voltage control block 400 according to the embodiment of the invention. The rectangular-wave voltage control block 400# includes an electric power calculation portion 460 and a torque estimation portion 470 instead of the coordinate conversion portion 220 and the torque estimation portion 420 included in the rectangular-wave voltage control block 400 (FIG. 6). Namely, the rectangular-wave voltage control blocks 400 and 400# both control the torque from the alternating-current motor M1 in a feedback manner. However, the rectangular-wave voltage control blocks 400 and 400# are different from each other in the method for estimating the output torque.

The electric power calculation portion 460 calculates the motor supply electric power Pmt according to the following equation (6), using the phase currents obtained based on the V-phase current iv and the W-phase current iw detected by the current sensors 24 and the phase voltages Vu, Vv, Vw of the respective U-phase, V-phase and W-phase based on the value detected by the voltage sensor 13.

$$Pmt = iu \times Vu + iv \times Vv + iw \times Vw \quad (6)$$

The torque estimation portion 470 calculates the torque estimated value Trq according to the equation (7), using the angular speed ω calculated based on the motor supply electric power Pmt obtained by the electric power calculation portion 460 and the rotational angle θ of the alternating-current motor M1 detected by the rotational angle sensor 25.

$$Trq = Pmt/\omega \quad (7)$$

The configuration of the torque feedback control after the torque estimated value Trq is calculated is the same as that in the rectangular-wave control block 400 in FIG. 6. Accordingly, detailed description concerning the configuration of the torque feedback control after the torque estimated value Trq is calculated will not be provided below.

As shown in FIG. 10, in the rectangular-wave voltage control block 400# according to the comparative example, the output from the voltage sensor 13 is required, in addition to the outputs from the current sensors 24 and the position sensor 25. Accordingly, when the control mode is switched between the PWM control mode and the rectangular-wave voltage control mode, the state quantity (quantity detected by the sensors) of the alternating-current motor M1, which is used in the motor control, changes.

Figure 11:
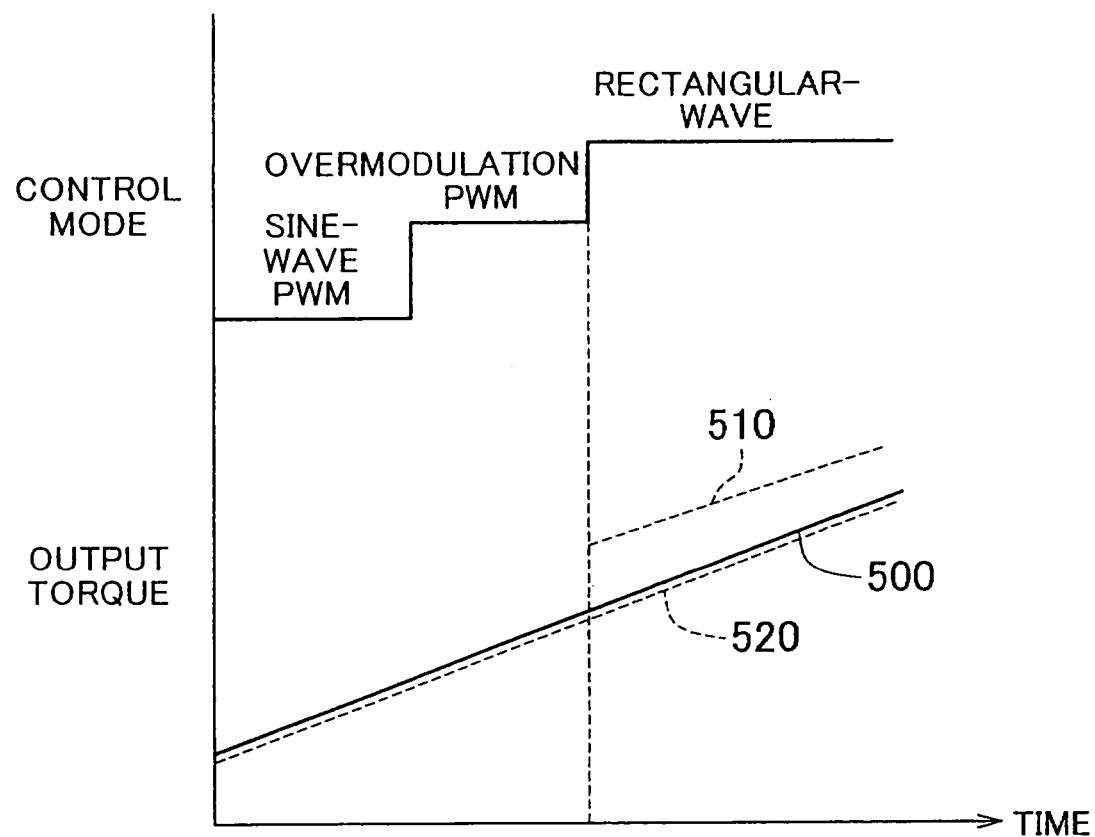
FIG. 11 is the graph showing the manner in which the output torque changes when the control mode is switched.

FIG. 11 the graph showing the difference in the manner, in which the output torque changes when the control mode is switched, between the rectangular-wave voltage control block 400 (FIG. 6) and the rectangular-wave voltage control block 400# (FIG. 8).

As shown in FIG. 11, as a torque command value 500 increases, the control modes for the alternating-current motor M1 gradually changes from the sine-wave PWM control mode to the overmodulation PWM control mode, and then from the overmodulation PWM control mode to the rectangular-wave voltage control mode in order to obtain high output.

Especially, when the control mode is switched between the overmodulation PWM control mode and the rectangular-wave voltage control mode, the control block is changed from the PWM control block 200 (FIG. 5) to the rectangular-wave voltage control block 400 (FIG. 6) or the rectangular-wave voltage control block 400# (FIG. 10).

In the torque control using the rectangular-wave voltage control block 400# (FIG. 10) shown as the comparative example, the value detected by the voltage sensor 13, in addition to the values detected by the current sensors 24 and the position sensor 25, is used in the output torque control. Therefore, the output torque may fluctuate in a stepwise manner as shown by a reference numeral 510 due to an error in the torque estimated value Trq obtained by the torque estimation portion 420, which is caused, for example, by an error in detection by the voltage sensor 13.

In contrast, in the output torque control using the rectangular-wave voltage control block 400 (FIG. 6) according to the embodiment of the invention, even if the control mode is switched, the motor state quantity (quantity detected by the sensors), used in the feedback control, does not change. Accordingly, as shown by a reference numeral 520, it is possible to prevent a stepwise fluctuation in the output torque, which is likely to occur when the control mode is switched. Thus, it is possible to avoid reduction in the efficiency of the output torque control which is likely to be caused when the control mode is switched between the PWM control mode and the rectangular-wave voltage control mode. More specifically, it is possible to prevent a stepwise fluctuation in the torque due to an error in the estimated torque, which is caused, for example, by an error in detection by the voltage sensor 13.

In the configuration shown in the embodiment, the current sensors 24 and the rotational angle sensor 25 correspond to a "current detector" and a "position detector" in the invention, respectively. Step S120 in FIG. 3 corresponds to "control mode selection means" in the invention. The PWM control block 200 (FIG. 5) corresponds to "second motor control means" in the invention, and the rectangular-wave voltage control block 400 (FIG. 6) corresponds to "first motor control means" in the invention. The torque estimation portion 420, the PI calculation portion 430, and the rectangular-wave generation portion 440/the signal preparation portion 450 in FIG. 6 correspond to "first torque estimation means", "voltage phase control means", and "first voltage control means" in the invention, respectively. The motor constant correction portion 424 in FIG. 9 corresponds to "constant correction means" in the invention.

Figure 12:
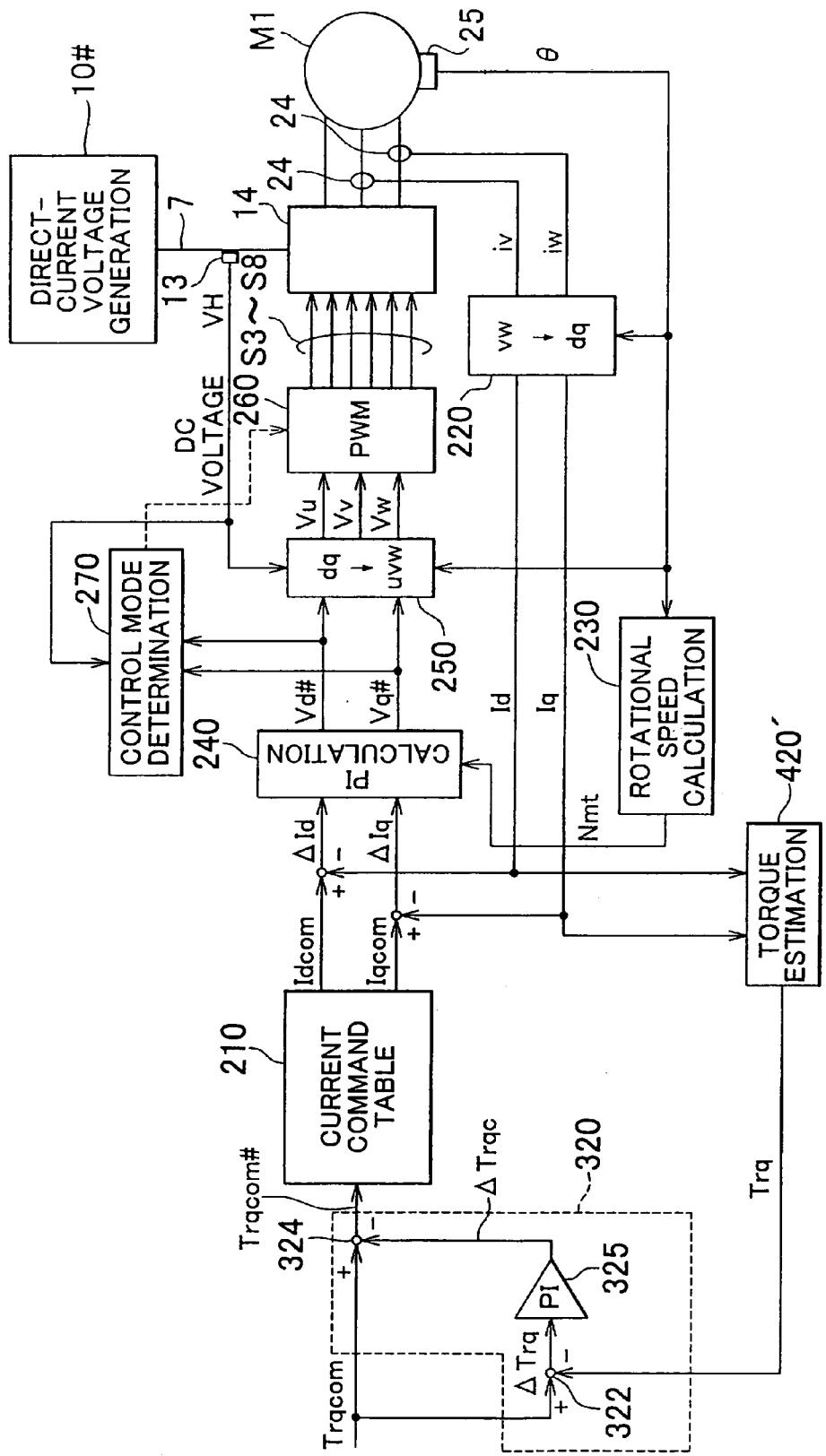
FIG. 12 is the control block diagram when the PWM control mode is used in a motor drive system according to a modified example of the embodiment of the invention.

Next, a modified example of the embodiment of the invention will be described. FIG. 12 shows a control block for the PWM control mode according to the modified example of the embodiment of the invention.

As shown in FIG. 12, in a motor drive system according to the modified example of the embodiment of the invention, in the PWM control mode, a torque feedback control loop is added to the motor current feedback control shown in FIG. 6 by further providing a torque estimation portion 420' and a torque command value modification portion 320.

The torque estimation portion 420' calculates the torque estimated value Trq based on the d-axis current Id and the q-axis current Iq, as in the case of the rectangular-wave voltage control mode. The torque command value modification portion 320 includes addition points 322, 324 and a PI calculation portion 325. At the addition point 322, the torque deviation $\Delta$Trq ($\Delta$Trq=Trqcom–Trq) of the torque estimated value Trq estimated by the torque estimation portion 420' from the torque command value Trqcom for the alternating-current motor M1 is obtained. The PI calculation portion 325 obtains the control deviation by performing the PI calculation on the torque deviation $\Delta$Trq using a predetermined gain. The control deviation obtained by the PI calculation portion 325 is used as the torque modification amount $\Delta$Trqc, and the torque modification amount $\Delta$Trqc is subtracted from the torque command value Trqcom at the addition point 324, whereby the torque command value Trqcom# modified by the torque feedback control is obtained.

After the toque command value Trqcom# is calculated, the torque output from the alternating-current motor M1 is controlled based on the torque command value Trqcom# by the feedback control that is the same as the motor current control performed based on the torque command value Trqcom shown in FIG. 6.

With such configuration, the deviation of the torque estimated value Trq in the rectangular-wave voltage control mode from the torque command value Trqcom is reflected on the d-axis current command value Idcom and the q-axis current command value Iqcom prepared by the current command preparation portion 210. Accordingly, the torque feedback loop is formed in both of the PWM control mode and the rectangular-wave voltage control mode based on the same torque estimation. Therefore, it is possible to more effectively prevent a fluctuation in the output torque that is likely to occur when the control mode is switched.

When the alternating-current motor M1 is formed of a permanent magnet motor, if the temperature of the magnet increases due to heat generated by the electric power supplied to the motor, the output torque may decrease by the demagnetization action. Accordingly, by performing the motor current feedback control to which the torque feedback loop is added, a change in the motor characteristics due to a change in the temperature of the magnet is offset without detecting the temperature of the magnet and reflecting it on the feedback control. As a result, the output torque is controlled more appropriately.

The torque estimation portion 420', the torque command modification portion 320, and the current command preparation portion 210 in FIG. 12 correspond to "second torque estimation means", "torque command value modification means", and "current command preparation means" in the invention, respectively. The PI calculation portion 240, the coordinate conversion portion 250, and the PWM signal preparation portion 260 correspond to "second voltage control means" in the invention.

In the embodiment of the invention, the motor drive system, which drives and controls the electric motor mounted in the hybrid vehicle or the electric vehicle as the drive motor, is described. However, application of the invention is not limited to this. Namely, the invention may be applied to the output torque control performed in a motor drive system that has a control configuration in which the control mode is switched between the PWM control mode and the rectangular-wave voltage control mode, independently of the types of an electric motor to be controlled, and devices and systems to be mounted.

While the invention has been described with reference to an example embodiment thereof, it is to be understood that the invention is not limited to the example embodiment or constructions. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

What is claimed is:

1. A control apparatus for a motor drive system including an inverter that drives an alternating-current motor, comprising:
    a current detector that detects a motor current flowing to the alternating-current motor;
    a position detector that detects a rotational position of the alternating-current motor;
    a control mode selection device that selects a control mode for voltage conversion performed in the inverter based on an operating state of the alternating-current motor;
    a first motor control device that performs, when the control mode selection device selects a first control mode, in which a rectangular-wave voltage is applied to the alternating-current motor, torque control by performing feedback control, in which a phase of the rectangular-wave voltage is adjusted based on a deviation of a torque output from the alternating-current motor (M1) from a torque command value; and
    a second motor control device that performs, when the control mode selection device selects a second control mode, in which a voltage applied to the alternating-current motor is controlled in a pulse-width modulation mode, torque control by performing feedback control on the motor current based on a current command value corresponding to the torque command value, wherein
    the first motor control device includes:
    a first torque estimation device that estimates the torque output from the alternating-current motor based on outputs from the current detector and the position detector;
    a voltage phase control device that determines the phase of the rectangular-wave voltage based on a deviation of the torque estimated by the first torque estimation device from the torque command value; and
    a first voltage control device that controls voltage conversion performed in the inverter so that the rectangular-wave voltage with the phase determined by the voltage phase control device is applied to the alternating-current motor, and
    the second motor control device performs the feedback control on the motor current based on the outputs from the current detector and the position detector.

2. The control apparatus according to claim 1, wherein
    the current detector is provided so as to detect currents flowing to respective phases of the alternating-current motor, and
    the first torque estimation device estimates the torque output from the alternating-current motor based on a d-axis current and a q-axis current for the alternating-current motor, which are calculated based on the outputs from the current detector and the position detector.

3. The control apparatus according to claim 2, wherein
    the first torque estimation device estimates the torque output from the alternating-current motor based on the d-axis current and the q-axis current, and a motor constant of the alternating-current motor, and
    the control apparatus further comprises a constant correction device that corrects the motor constant based on the d-axis current and the q-axis current.

4. The control apparatus according to claim 1, wherein
    the second motor control device includes:
    a second torque estimation device that estimates the torque output from the alternating-current motor based on the outputs from the current detector and the position detector in a manner similar to a manner in which the first torque estimation device estimates the torque output from the alternating-current motor;
    a torque command value modification device for modifying the torque command value based on a deviation of the torque estimated by the second torque estimation device from the torque command value;
    a current command preparation device that prepares the current command value based on the torque command value modified by the torque command value modification device; and
    a second voltage control device that controls voltage conversion performed in the inverter so that the voltage applied to the alternating-current motor is controlled based on a deviation of the motor current based on a value detected by the current detector from the current command value prepared by the current command preparation device.

5. The control apparatus according to claim 1, wherein
    the second control mode includes a sine-wave pulse-width modulation mode in which a modulation rate falls within a range from 0 to 0.61, and an over modulation pulse-width modulation mode in which a fundamental wave component is deformed so that the modulation rate falls within a range from 0.61 to 0.78.

6. A control method for a motor drive system including an inverter that drives an alternating-current motor, comprising:
    a step of detecting a motor current flowing to the alternating-current motor;
    a step of detecting a rotational position of the alternating-current motor;
    a step of selecting a control mode for voltage conversion performed in the inverter based on an operating state of the alternating-current motor; and
    a step of performing, when a first control mode, in which a rectangular-wave voltage is applied to the alternating-current motor, is selected, torque control by performing feedback control, in which a phase of the rectangular-wave voltage is adjusted based on a deviation of a torque output from the alternating-current motor from a torque command value, wherein the torque output from the alternating-current motor is estimated based on outputs from the current detector and the position detector; the phase of the rectangular-wave voltage is determined based on a deviation of the estimated torque from the torque command value; and voltage conversion performed in the inverter is controlled so that the rectangular-wave voltage with the determined phase is applied to the alternating-current motor; and
    a step of performing, when a second control mode, in which a voltage applied to the alternating-current motor is controlled in the pulse-width modulation mode, is selected, torque control by performing feedback control on the motor current based on a current command value corresponding to the torque command value, wherein the feedback control is performed on the motor current based on the detected motor current and the detected rotational position, wherein, when the second control method is selected, the torque output from the alternating-current motor is estimated based on the detected motor current and the detected rotational position in a manner similar to a manner of the torque estimation, the torque command value is modified based on a deviation of the estimated torque from the torque command value, the current command value is prepared based on the modified torque command value, and voltage conversion performed in the inverter is controlled so that the voltage applied to the alternating-current motor is controlled based on a deviation of the detected motor current from the prepared current command value.

7. The control method according to claim 6, wherein
the torque output from the alternating-current motor is estimated based on a d-axis current and a q-axis current for the alternating-current motor.

8. The control method according to claim 7, wherein
the torque output from the alternating-current motor is estimated based on the d-axis current and the q-axis current and a motor constant of the alternating-current motor, and the motor constant is corrected based on the d-axis current and the q-axis current.

9. A control method for a motor drive system including an inverter that drives an alternating-current motor, comprising:
a step of detecting a motor current flowing to the alternating-current motor;
a step of detecting a rotational position of the alternating-current motor;
a step of selecting a control mode for voltage conversion performed in the inverter based on an operating state of the alternating-current motor; and
a step of performing, when a first control mode, in which a rectangular-wave voltage is applied to the alternating-current motor, is selected, torque control by performing feedback control, in which a phase of the rectangular-wave voltage is adjusted based on a deviation of a torque output from the alternating-current motor from a torque command value, wherein the torque output from the alternating-current motor is estimated based on outputs from the current detector and the position detector; the phase of the rectangular-wave voltage is determined based on a deviation of the estimated torque from the torque command value; and voltage conversion performed in the inverter is controlled so that the rectangular-wave voltage with the determined phase is applied to the alternating-current motor; and
a step of performing, when a second control mode, in which a voltage applied to the alternating-current motor is controlled in the pulse-width modulation mode, is selected, torque control by performing feedback control on the motor current based on a current command value corresponding to the torque command value, wherein the feedback control is performed on the motor current based on the detected motor current and the detected rotational position, wherein
the second control mode includes a sine-wave pulse-width modulation mode in which a modulation rate falls within a range from 0 to 0.61, and an overmodulation pulse-width modulation mode in which a fundamental wave component is deformed so that the modulation rate falls within a range from 0.61 to 0.78.

* * * * *